March 17, 1925.  S. SOLON  1,530,212

AMALGAM MIXER

Filed Nov. 5, 1923  2 Sheets-Sheet 1

Witnesses:

Inventor:
Samuel Solon
By Joshua R. H. Potts.
His Attorney.

March 17, 1925.

S. SOLON

AMALGAM MIXER

Filed Nov. 5, 1923

Witnesses:

Inventor:
Samuel Solon
By Joshua R. H. Potts
His Attorney.

Patented Mar. 17, 1925.

1,530,212

UNITED STATES PATENT OFFICE.

SAMUEL SOLON, OF CHICAGO, ILLINOIS.

AMALGAM MIXER.

Application filed November 5, 1923. Serial No. 672,748.

*To all whom it may concern:*

Be it known that I, SAMUEL SOLON, a citizen of the United States, and a resident of the city of Chicago, county of Cook, and State of Illinois, have invented certain new and useful Improvements in Amalgam Mixers, of which the following is a specification.

My invention relates to certain new and useful improvements in amalgam mixers, and especially such as are used by dentists and are operated by the dental engine; and the invention has for its chief objects the provision of a device of this type which is extremely simple and durable and is therefore inexpensive to manufacture, and at the same time is very convenient and highly efficient in use.

The invention consists in the combinations and arrangements of parts hereinafter described and claimed.

The invention will be best understood by reference to the accompanying drawings forming a part of this specification, and in which—

Figure 1:
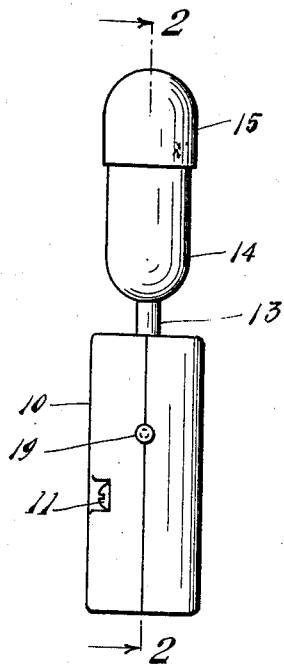
Fig. 1 is an elevation of the hand supported and preferred form of my invention.
Figure 2:
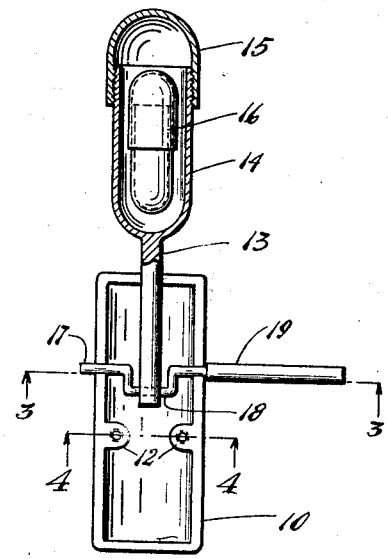
Fig. 2 is a longitudinal section on line 2—2 of Fig. 1.
Figure 3:
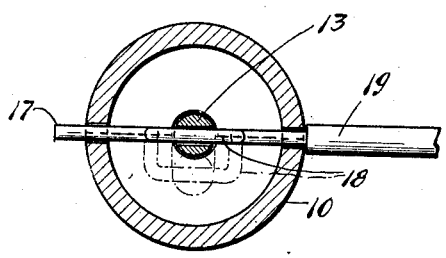
Figure 4:
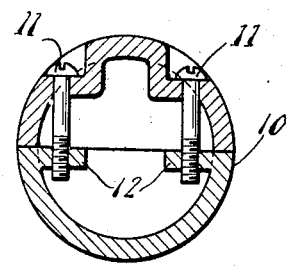
Figure 5:
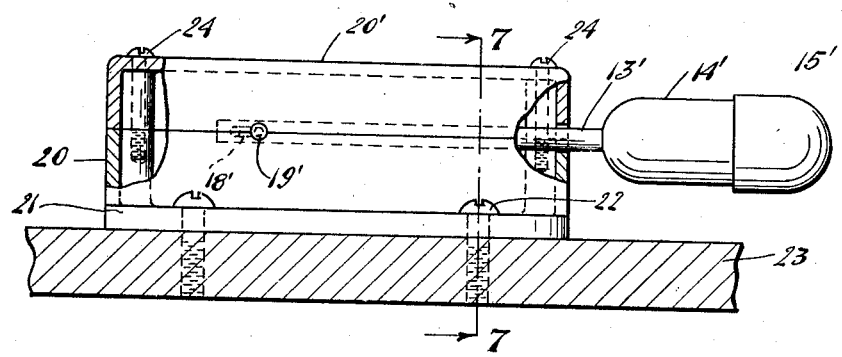
Figure 6:
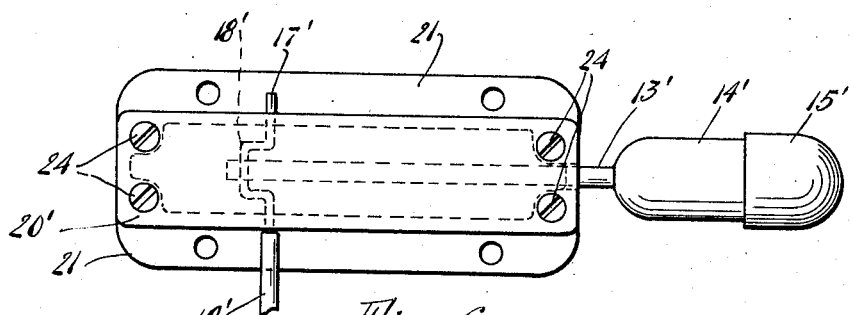

Figs. 3 and 4 are enlarged cross sections on lines 3—3 and 4—4 of Fig. 2;

Fig. 5 is an elevational view, partly broken away, of a modified form of my invention;

Fig. 6 is a plan view of the modified form, and

Figure 7:
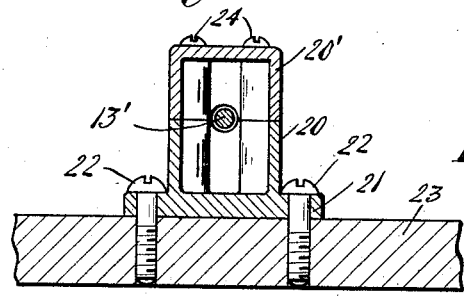

Fig. 7 is a vertical section on line 7—7 of Fig. 5.

The form of my invention illustrated in Figs. 1 to 4, inclusive, comprises an oblong supporting member or housing 10, shaped to be held by the hand, and preferably consists of two parts detachably fastened together, as by means of screws 11 extending through one part and engaging in lugs 12 in the other part. A shaft 13 is mounted to slide through an end wall of said housing and carries a receptacle or holder 14 on its outer end and preferably integral therewith, as best shown in Fig. 2, a cap 15 being threaded or otherwise detachably mounted over the open end of said holder to provide a closed receptacle which is of sufficient size for loosely containing the usual capsule or container 16 with the dentist's amalgam therein. A crank member 17 has portions journalled in the side walls of said housing and has an integral crank portion 18 engaging the inner end of shaft 13 and is preferably pivotally extended through said end; said crank member also contains a part or stem 19 preferably integral therewith, and which is suitably shaped to be engaged and driven by the chuck of the usual dental engine (not shown). The rotation of said crank means will thus reciprocate the shaft with its holder or receptacle 14, and as the capsule with the amalgam contained therein is considerably smaller than said holder, the capsule will be shaken in the holder, and the usual amount of amalgam will be shaken within the capsule, thus producing a very effective means for thoroughly mixing the amalgam in the capsule.

The modified form shown in Figs. 5 to 7, inclusive, comprises a housing or supporting means 20 having side flanges 21 with openings for screws 22 to fasten the housing to a suitable stand or support 23, said housing having an upper part 20' which is removably mounted, as by means of screws 24. The shaft 13', as in the preceding form, is slidably mounted through the housing end and is preferably integral with a holder 14' provided with a removable cap 15' arranged of proper size for shaking the usual amalgam capsule. A crank member 17' with a crank 18' engaging the shaft, is also provided and contains the stem 19' shaped to be engaged by the chuck of the dental engine, similar to the preceding form.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. An amalgam mixer comprising a housing adapted to be supported in the hand, a shaft mounted to reciprocate in said housing, a receptacle on the outer end of said shaft, and a member engaging the inner end of said shaft and adapted to be engaged by a driving mechanism for reciprocating said shaft and receptacle.

2. An amalgam mixer comprising a supporting housing, a shaft mounted to slide longitudinally through the end of said housing, a receptacle on the outer end of said shaft arranged to contain an amalgam capsule, and a member journalled in said housing and having a crank portion rotatably engaging the inner end of said shaft and having a stem outward of said housing to be engaged and driven by the chuck of a dental engine.

3. An amalgam mixer comprising a housing shaped to be supported in the hand, a shaft movable longitudinally in said housing, a receptacle on the outer end of said shaft and having its body portion integral therewith, and a member engageable with the inner end of said shaft and with a driving mechanism for reciprocating said shaft and receptacle.

4. An amalgam mixer comprising an oblong housing arranged and shaped to be supported in the hand, a shaft movable longitudinally through the end of said housing, a receptacle at the outer end of said shaft and arranged for shaking an amalgam capsule longitudinally therein, a crank member journalled in said housing to engage said shaft and reciprocate said shaft and receptacle, and means on said crank member engageable by the driving chuck of a dental engine.

5. An amalgam mixer comprising a housing provided with lateral flanges having openings and threaded means for mounting it on a support, a shaft extending through said housing, a receptacle on the end of said shaft with a portion integral with said shaft, and arranged for shaking an amalgam capsule to and fro therein, and crank means journalled in said housing for reciprocating said shaft and receptacle.

In testimony whereof I have signed my name to this specification in the presence of two subscribing witnesses.

SAMUEL SOLON.

Witnesses:
FREDA C. APPLETON,
MARGARET ANER.